Patented Feb. 24, 1948

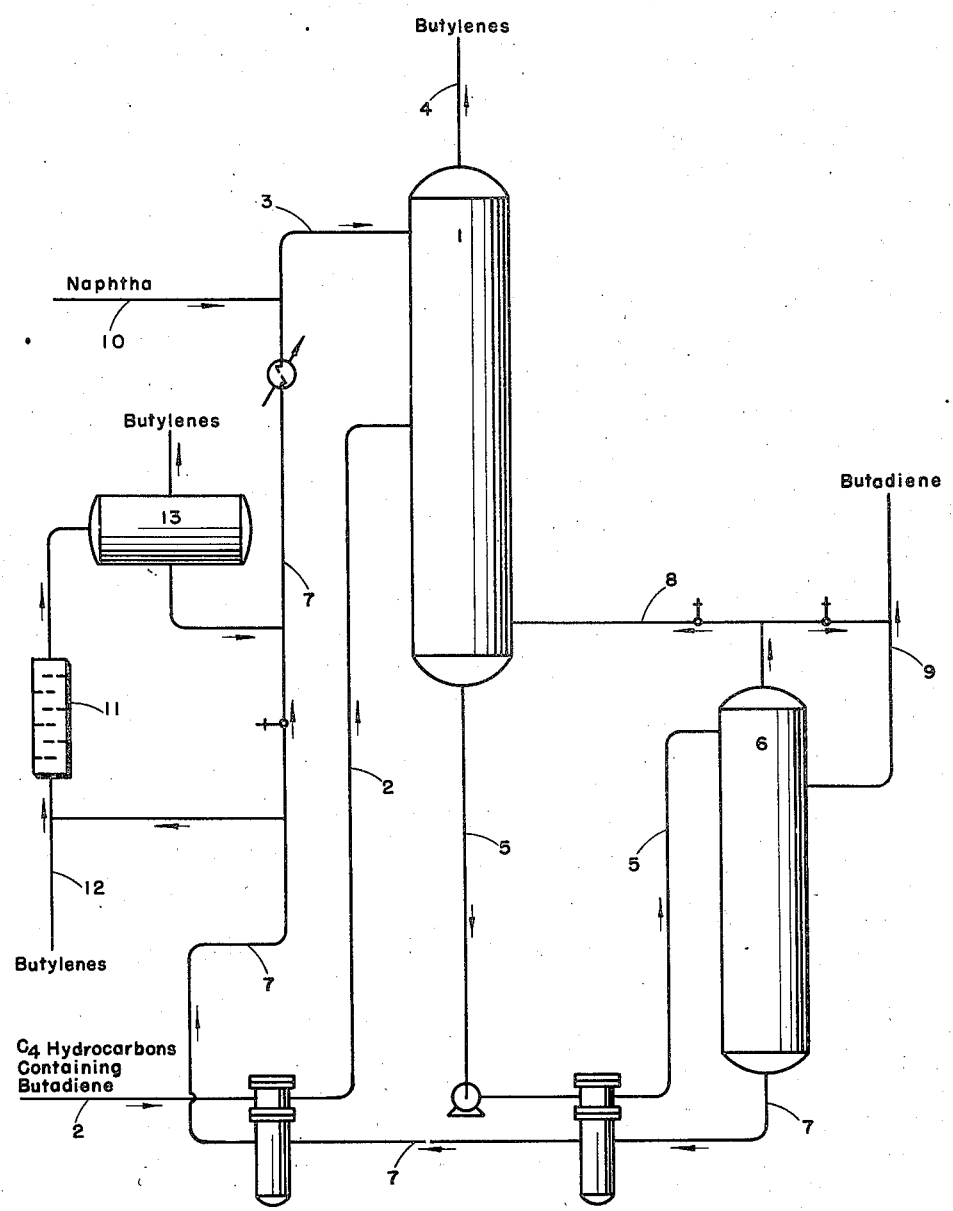

2,436,471

UNITED STATES PATENT OFFICE 2,436,471

VAPOR PHASE EXTRACTION

William B. Franklin, Baytown, Tex., assignor, by mesne assignments, to Standard Oil Development Company, Elizabeth, N. J., a corporation of Delaware Application May 13, 1946, Serial No. 669,273

6 Claims. (Cl. 260—681.5)

The present application is a continuation-in-part of my copending application Serial No. 547,595, filed August 1, 1944, which has become abandoned.

The present invention is directed to a process in which a mixture of gaseous or vaporous constituents is scrubbed with a liquid capable of taking up one or more of said constituents. A particular process of this general type to which the present invention is especially applicable is the recovery of butadiene from a mixture of C₄ hydrocarbons containing it, by scrubbing the mixture with an ammoniacal solution of cuprous acetate.

It has been found that the efficiency of a scrubbing operation of the aforesaid type is greatly increased by adding to the scrubbing liquid another liquid chemically inert to the scrubbing liquid and to the gaseous constituents being treated but having high solvent power for such constituents. In the ordinary case, this second liquid will also be immiscible with the scrubbing liquid. The second liquid apparently serves as a carrier for bringing the gaseous substances into intimate contact with the scrubbing liquid. For purposes of discussion, this second liquid will be hereafter referred to as a carrier liquid.

In the particular operation heretofore mentioned, in which C₄ hydrocarbons are scrubbed with an ammoniacal solution of cuprous acetate, an excellent carrier liquid is naphtha of a boiling range as low as possible considering that it must remain in the liquid phase at the temperature at which the scrubbing operation is performed. Naphtha has substantially no selectivity for butadiene. Therefore, it absorbs all of the C₄ hydrocarbons. Consequently, it is not advantageous to use a large quantity of naphtha because if this were subjected to desorption with ammoniacal cuprous acetate solution, it would be impossible to obtain pure butadiene. The amount of naphtha, therefore, is held at a minimum. It has been found that in this particular operation an amount of naphtha not in excess of 0.1% by volume of the copper salt solution effectively functions to increase the scrubbing efficiency of the latter.

The nature of the present invention may be better understood from the following detailed description of the accompanying drawing in which the single figure is a front elevation in diagrammatic form of a plant embodying said invention.

Referring to the drawing in detail, numeral 1 designates a scrubbing tower. The gases to be scrubbed are introduced into an intermediate point of said tower by line 2. A scrubbing medium is introduced into the upper part of said tower by line 3. Unabsorbed gases leave the top of the tower through line 4. The scrubbing liquid, with its absorbed constituents, leaves the bottom of the tower through line 5 by which it is conducted to a desorption tower 6.

Entering the top of tower 6 the fat scrubbing liquid descends through the desorber either countercurrent to a suitable stripping medium or with a gradually increasing temperature which serves to liberate the absorbed gaseous constituents. The lean scrubbing medium leaves the bottom of desorber 6 through line 7 which carries it back to line 3. Suitable heat exchangers are arranged in lines 2, 5 and 7 for efficient utilization of heat.

The liberated gaseous constituent leaves the top of the desorber through line 8. In certain cases it may be desirable to take off the purified gaseous constituent as a side stream through line 9. Line 8 connects both with line 9 and with the bottom of tower 1.

In the particular operation already referred to, the feed to the scrubbing tower 1 is a mixture of C₄ hydrocarbons containing butadiene. The scrubbing medium is an ammoniacal solution of cuprous acetate. The scrubbing tower is operated at a pressure ranging from atmospheric to about 8 pounds per square inch gauge. A temperature of about 25° F. is maintained in the upper part of the tower and a temperature between about 50° and 55° F. is maintained in the lower part of the tower. In the desorber, heaters are provided which maintain a temperature graduating from about 75° F. at the top of the tower to about 165° F. at the bottom. Naphtha is introduced into line 3 through line 10.

In this operation it is customary to by-pass the recycled copper salt solution from line 7 to an incorporator 11 ahead of which is arranged a feed line 12 for liquid butylenes. The mixture leaving the incorporator is passed to a settler 13 from the bottom of which the copper salt solution is returned to line 7. The purpose of this washing step is to remove from the copper salt solution acetylene polymers which accumulate and which give rise to frothing and other difficulties. The present invention applies with added advantage to an operation in which this washing step is included.

In a typical operation conducted under the conditions heretofore specified, the C₄ hydrocarbon mixture has a composition substantially as follows:

|  | Per cent |
|---|---|
| Butadiene | 25 |
| Isobutylene | 30 |
| N-butylene | 42 |
| Butanes | 3 |
| Total | 100 |

This mixture is fed to the tower at a rate of 10,000 pounds per hour. The copper salt solution is fed to the top of the tower at a rate of 20,000 to 30,000 gallons per hour and the naphtha is introduced at a rate of from 2 to 5 gallons per hour. Substantially pure butadiene is removed from the system through line 9 which, it will be observed, is connected to the desorber at a point below the point of introduction of the fat scrubbing medium. Line 8, being connected above the latter point, carries off gaseous constituents which are first flashed off from the fat scrubbing medium and, therefore, it carries less pure butadiene. Part of the butadiene in line 8 is injected to the bottom of scrubbing tower 1 for further purification.

It will be understood that the foregoing specific illustration of the process of the present invention is not intended to delineate the scope of the present invention. The use of a carrier liquid in the manner described finds application in other processes of this type. It is to be noted that while naphtha has been designated as the carrier liquid in the particular operation described, other liquids, such as kerosene and light gas oil, having suitable boiling point and chemical inertness to the gaseous constituents being treated and sufficient solvent power for said gaseous constituents may be employed. Similarly, while an ammoniacal solution of cuprous acetate has been designated as the preferred scrubbing liquid, other liquids which will absorb by chemical action and desorb by the application of heat, as for example water, ammoniacal water, and aqueous solutions of silver nitrate, mercuric cyanide, and cuprous chloride, may also be used.

The nature and objects of the present invention having been fully described and illustrated, what I desire to claim as new and useful and to secure by Letters Patent is:

1. In a process in which a mixture of gaseous hydrocarbon constituents is scrubbed with an aqueous metallic salt solution which is liquid and capable of selectively taking up at least one of said constituents, the step of adding to the scrubbing liquid an amount of a hydrocarbon carrier liquid not substantially in excess of 0.1% by volume of the scrubbing liquid which is immiscible therewith and chemically inert to the scrubbing liquid and to the gaseous constituents undergoing treatment and having strong solvent power for said gaseous constituents.

2. In a process in which a mixture of gaseous hydrocarbons containing butadiene is scrubbed with an aqueous metallic salt solution which is liquid and capable of selectively taking up said butadiene, the step of adding to the scrubbing liquid an amount of a hydrocarbon carrier liquid not substantially in excess of 0.1% by volume of said scrubbing liquid.

3. A method according to claim 2 in which the carrier liquid is a naphtha.

4. A process according to claim 2 in which the scrubbing liquid is an ammoniacal solution of cuprous acetate.

5. A method according to claim 2 in which the scrubbing liquid is an ammoniacal solution of cuprous acetate and the carrier liquid is naphtha.

6. In a process in which a mixture of gaseous constituents containing butadiene is scrubbed with an ammoniacal solution of cuprous acetate for the selective removal of butadiene therefrom, the step of adding to the cuprous acetate solution an amount of naphtha not substantially in excess of .1% by volume of said solution.

WILLIAM B. FRANKLIN.

REFERENCES CITED

The following references are of record in the file of this patent:

UNITED STATES PATENTS

| Number | Name | Date |
|---|---|---|
| 2,365,898 | Morris et al. | Dec. 26, 1944 |
| 2,384,378 | Hooker et al. | Sept. 4, 1945 |